United States Patent
Miyachi

(10) Patent No.: US 8,770,853 B2
(45) Date of Patent: Jul. 8, 2014

(54) SPLIT CAGE FOR ROLLING BEARING

(71) Applicant: JTEKT Corporation, Osaka (JP)

(72) Inventor: Takeshi Miyachi, Yao (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/896,682

(22) Filed: May 17, 2013

(65) Prior Publication Data

US 2013/0308885 A1    Nov. 21, 2013

(30) Foreign Application Priority Data

May 18, 2012   (JP) .................. 2012-114277

(51) Int. Cl.
*F16C 33/46*        (2006.01)
*F16C 33/56*        (2006.01)

(52) U.S. Cl.
USPC .......................................... 384/572; 384/576

(58) Field of Classification Search
USPC ................... 384/527, 572, 576, 577
See application file for complete search history.

(56) References Cited

U.S. PATENT DOCUMENTS

| 2,946,633 A  * | 7/1960 | Gothberg ................ 384/576 |
| 3,086,827 A    | 4/1963 | White |
| 2009/0074345 A1* | 3/2009 | Omoto .................... 384/572 |

FOREIGN PATENT DOCUMENTS

| EP | 2 264 325 A1 | 12/2010 |
| FR | 2 537 676 A1 | 6/1984 |
| JP | 60008525 A * | 1/1985 |
| JP | A-2003-013967 | 1/2003 |
| JP | 2009228752 A * | 10/2009 |
| JP | A-2010-071321 | 4/2010 |
| WO | WO 2011/062188 A1 | 5/2011 |

OTHER PUBLICATIONS

Nov. 6, 2013 European Search Report issued in European Application No. 13167834.4.

* cited by examiner

*Primary Examiner* — Phillip A Johnson
(74) *Attorney, Agent, or Firm* — Oliff PLC

(57) ABSTRACT

A split cage for a rolling bearing includes a plurality of cage segments formed of synthetic resin and arranged annularly in a circumferential direction. Each cage segment includes: a first rim portion and a second rim portion that are spaced from each other by a predetermined interval and face each other; and a plurality of bar portions extending from the first rim portion to the second rim portion. Spaces, each of which is surrounded by the bar portions adjacent to each other and the first and second rim portions, are formed as pockets that house rolling elements. Projections for reinforcement are formed at radial end portions of boundaries between the bar portions and the first rim portion and/or boundaries between the bar portions and the second rim portion.

1 Claim, 4 Drawing Sheets

SPLIT CAGE FOR ROLLING BEARING

INCORPORATION BY REFERENCE

The disclosure of Japanese Patent Application No. 2012-114277 filed on May 18, 2012 including the specification, drawings and abstract, is incorporated herein by reference in its entirety.

BACKGROUND OF THE INVENTION

1. Field of the Invention

The invention relates to a split cage for a rolling bearing, in which a plurality of cage segments is annularly arranged.

2. Description of the Related Art

In conventional horizontal axis propeller type wind power generation apparatuses, rolling bearings are used to rotatably support a main shaft to which blades are attached. In recent years, since the sizes of the wind power generation apparatuses are increased, the diameter of the main shaft may exceed several meters. In order to support such a large-sized main shaft, the size of the rolling bearing is also increased. A cage formed of synthetic resin may be used for such a large-sized rolling bearing. The synthetic resin cage is advantageous over a metallic cage assembled by welding in that the synthetic resin cage is light in weight and a sufficient accuracy of the synthetic resin cage is easily achieved. However, it is not easy to mold a synthetic resin cage with a large diameter as an integral unit by injection molding. Therefore, a split cage formed of circumferentially divided pieces is used (e.g., see EP Patent No. 2264325 A1). In the split cage, a plurality of cage segments is annularly arranged.

FIG. 5 is a perspective view of a main portion of an example of a conventional cage segment. FIG. 6 is a sectional view of a main portion of a tapered roller bearing in which conventional cage segments are used. The cage segment 100 has a pair of first and second rim portions 101 and 102, and a plurality of bar portions 103 extending from the first rim portion 101 to the second rim portion 102. The first and second rim portions 101 and 102 are spaced from each other by a predetermined interval and face each other. In this cage segment 100, spaces, each of which is surrounded by the bar portions 103 adjacent to each other and the first and second rim portions 101 and 102, are formed as pockets 104 that house tapered rollers 113 (see FIG. 6) that are provided as rolling elements. The cage segment 100 is a synthetic resin cage molded by injection molding.

In the tapered roller bearing 110, a plurality of tapered rollers 113 is arranged between an outer ring 111 and an inner ring 112. The tapered rollers 113 are held by a split cage 120 that is formed of the cage segments 100. A raceway surface 112a on which the tapered rollers 113 roll is formed on an outer periphery of the inner ring 112. On two opposite sides of the raceway surface 112a, there are provided a large rib portion 112b and a small rib portion 112c that contact end surfaces of each tapered roller 113.

The tapered roller bearing 110 is assembled by, for example, arranging the cage segments 100 annularly along the outer periphery of the inner ring 112, sequentially inserting the tapered rollers 113 into the pockets 104 of the cage segments 100 and then fitting the outer ring 111 so that the outer periphery of the outer ring 111 contacts the tapered rollers 113.

In the tapered roller bearing 110 as described above, it is preferable that the number of tapered rollers 113 be as large as possible in order to secure a sufficient loading capacity of the bearing. Thus, the size of each bar portion 103 of each cage segment 100 in the circumferential direction is inevitably made small. If the thickness of each bar portion 103 is reduced, the sectional areas of the connecting portions between the bar portions 103 and the first and second rim portions 101 and 102 are also reduced. As a result, there is a possibility that the cage segment 100 may be impaired due to the reduction of the strength of the connection portions.

SUMMARY OF THE INVENTION

An object of the invention is to provide a split cage for a rolling bearing, in which the strength of connecting portions between bar portions and a rim portion is improved.

A split cage for a rolling bearing according to an aspect of the invention includes a plurality of cage segments formed of synthetic resin and arranged annularly in a circumferential direction. Each of the cage segments includes: a first rim portion and a second rim portion that are spaced from each other by a predetermined interval and face each other; and a plurality of bar portions extending from the first rim portion to the second rim portion. Spaces, each of which is surrounded by the bar portions adjacent to each other, the first rim portion and the second rim portion, are formed as pockets that house rolling elements. Projection portions for reinforcement are formed at radial end portions of boundaries between the bar portions and the first rim portion and/or boundaries between the bar portions and the second rim portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of a split cage according to the invention will be described in detail hereinafter with reference to the accompanying drawings. In this specification, "radial direction" and "axial direction" refer to the directions with respect to a tapered roller bearing in which a split cage is disposed. For example, the "radial direction" means a radial outward direction and/or a radial inward direction in the tapered roller bearing. Furthermore, "plan view" means a view of a cage segment disposed on a raceway surface of an inner ring when the cage segment is seen from an outer ring side or from a radially outer side.

Figure 1:
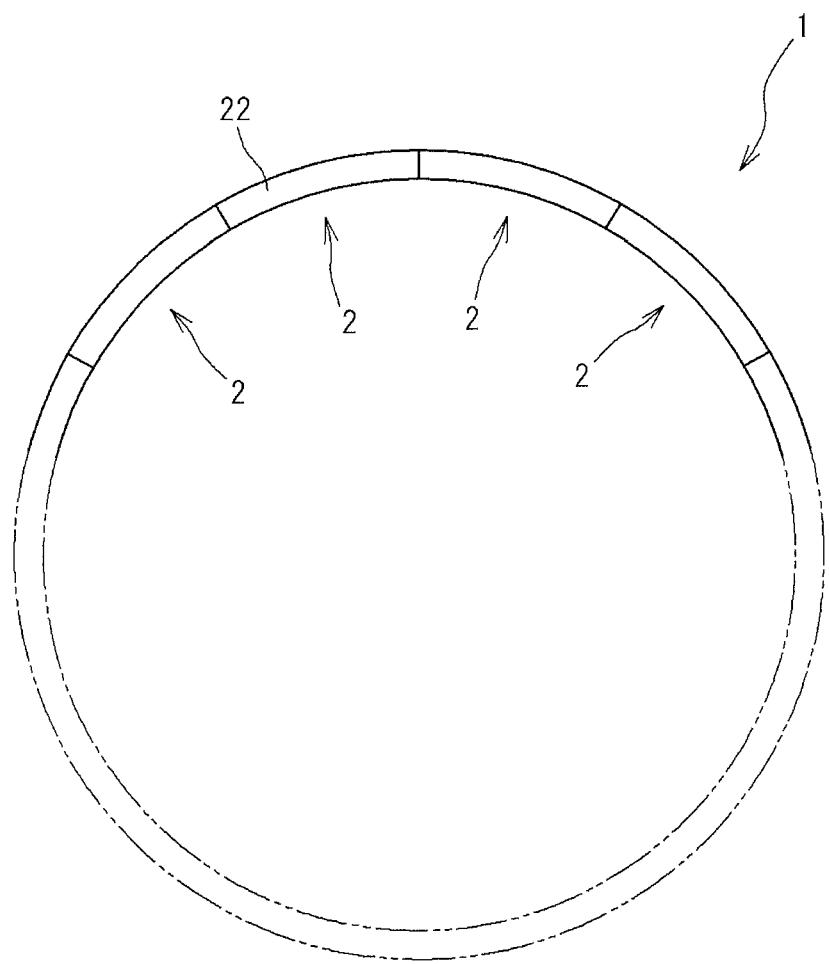
FIG. 1 is an illustration showing a split cage according to an embodiment of the invention.
Figure 2:
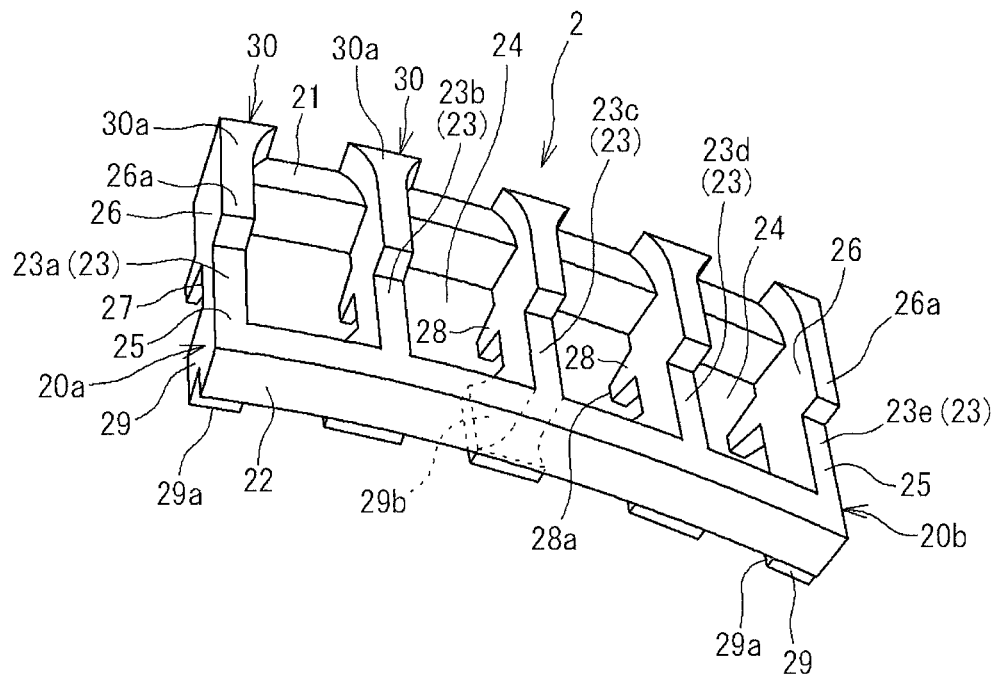
FIG. 2 is a perspective illustration showing a cage segment of the split cage shown in FIG. 1.

FIG. 1 is an illustration showing a split cage 1 according to an embodiment of the invention. FIG. 2 is a perspective illustration of a cage segment 2 that constitutes the split cage 1. The split cage 1 is a large-sized cage used in a rolling bearing that supports a main shaft of a wind power generation apparatus, and is configured by arranging a plurality of arc-shaped cage segments 2 annularly in a circumferential direction. Each cage segment 2 has a substantially rectangular shape in a plan view.

Each cage segment 2 includes a first rim portion 21 and a second rim portion 22 that are spaced from each other by a predetermined interval and face each other, and a plurality of bar portions 23 extending from the first rim portion 21 to the second rim portion 22. In each cage segment 2, spaces, each of which is surrounded by the two bar portions 23 adjacent to each other and the first and second rim portions 21 and 22, are formed as pockets that house rolling elements (not shown). Each segment 2 of the split cage 1 is a synthetic resin cage segment molded as an integral unit by injection molding.

The bar portions 23 of each cage segment 2 are five bar portions, that is, a first bar portion 23a, a second bar portion 23b, a third bar portion 23c, a fourth bar portion 23d and a fifth bar portion 23e, which are disposed at equal intervals in this order from one end side 20a (a left end side in FIG. 2) to another end side 20b of the cage segment 2.

In a radially outer-side surface 25 of each bar portion 23, a protrusion portion 26 is formed at an end portion in an axial direction (an axial end portion). Furthermore, in a radially inner-side surface 27 of each bar portion 23, a protrusion portion 28 is formed at an axial end portion. A distal expanded portion 29 is formed at another axial end portion in the radially inner-side surface 27 of each bar portion 23. A distal end surface 26a of each protrusion portion 26 is slidable with respect to a raceway surface of an outer ring of a tapered roller bearing in which the cage segments 2 are disposed. On the other hand, a distal end surface 28a of each protrusion portion 28 and a distal end surface 29a of each distal expanded portion 29 are slidable with respect to a raceway surface of an inner ring of the tapered roller bearing in which cage segments 2 are disposed. Side surfaces 29b of each distal expanded portion 29 are curved surfaces configured so as to receive tapered rollers.

Figure 3:
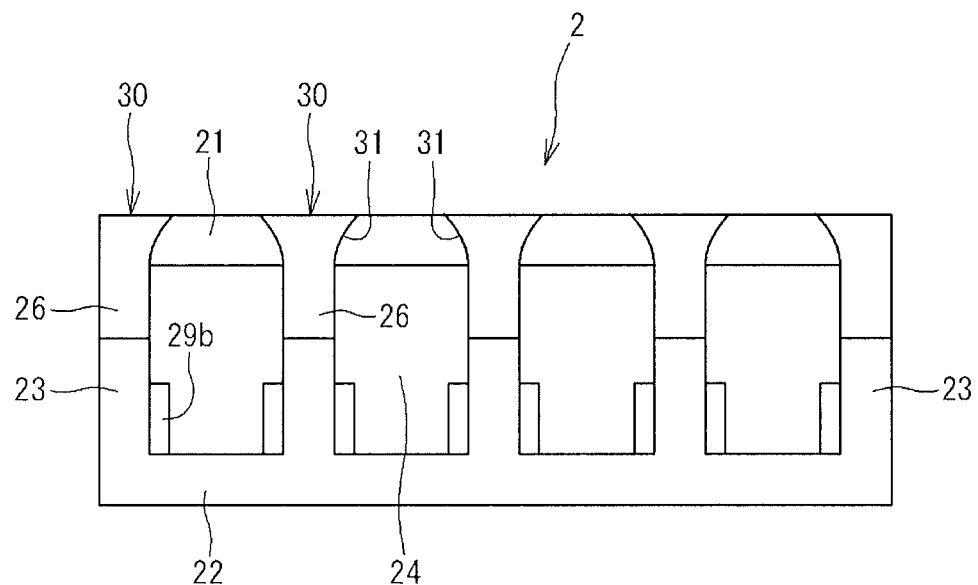
FIG. 3 is a plan illustration showing the cage segment shown in FIG. 2.

In this embodiment, a projection portion 30 for reinforcement is formed at a radial end portion (radially outer-side end portion) of a boundary between each bar portion 23 and the first rim portion 21. Each projection portion 30 is formed integrally with the protrusion portion 26, and a radially outer-side surface 30a of the projection portion 30 is flush with the distal end surface 26a of the protrusion portion 26. As shown in FIG. 3, each projection portion 30 has, in a plan view, an isosceles trapezoidal shape whose lower base is positioned at the first rim portion 21-side (at an axial outer portion of the first rim portion 21). Side surfaces 31 that correspond to the legs of each isosceles trapezoid in the plan view are curved surfaces that face the pockets 24.

In this embodiment, the projection portions 30 are formed at the boundaries between the bar portions 23 and the first rim portion 21, as described above. This increases the sectional areas of the connecting portions between the bar portions 23 and the first rim portion 21. As a result, the strength of the connecting portions can be improved.

Furthermore, in this embodiment, the side surfaces 31 of each projection portion 30 are curved surfaces. A distance between the curved surfaces increases in a direction toward the first rim portion 21-side (toward the axial outer portion of the first rim portion 21) so that the curved surface form a bell shape, and the curved surfaces face the pockets 24. The curved surfaces scrape lubricating oil, such as grease or the like, that is supplied in an annular space formed between the inner ring and the outer ring of the tapered roller bearing, and therefore the oil is supplied to the tapered rollers that are housed in the pockets 24. In rolling bearings, the cage occupies a large portion of the annular space formed between the inner ring and the outer ring, and therefore the lubricating oil, such as grease or the like, may not easily circulate. However, in this embodiment, the lubricating oil is scraped by the curved surfaces of the projection portions 30, and therefore the lubricating oil is supplied to the tapered rollers housed in the pockets. Thus, circulation of the lubricating oil is promoted. As a result, it is possible to suppress occurrence of lubrication failure in the tapered roller bearings.

Figure 4:
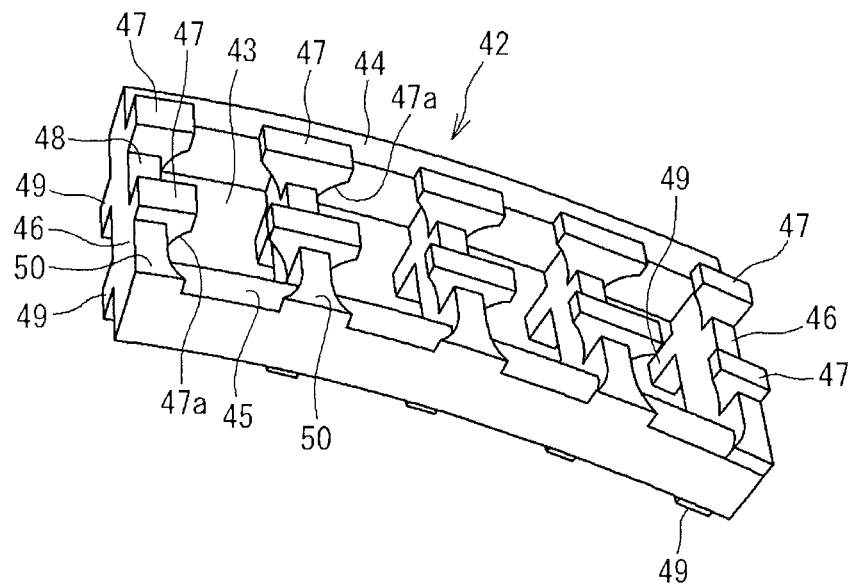
FIG. 4 is a perspective illustration of another example of the cage segment.
Figure 5:
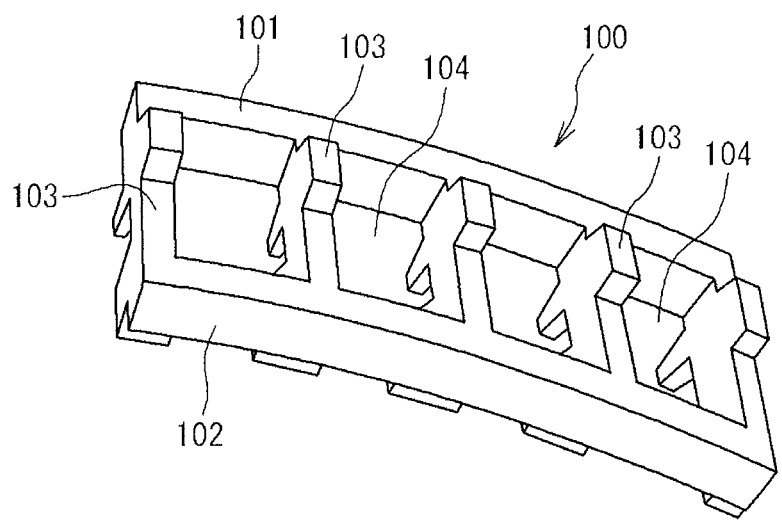
FIG. 5 is a perspective illustration showing an example of a conventional cage segment.
Figure 6:
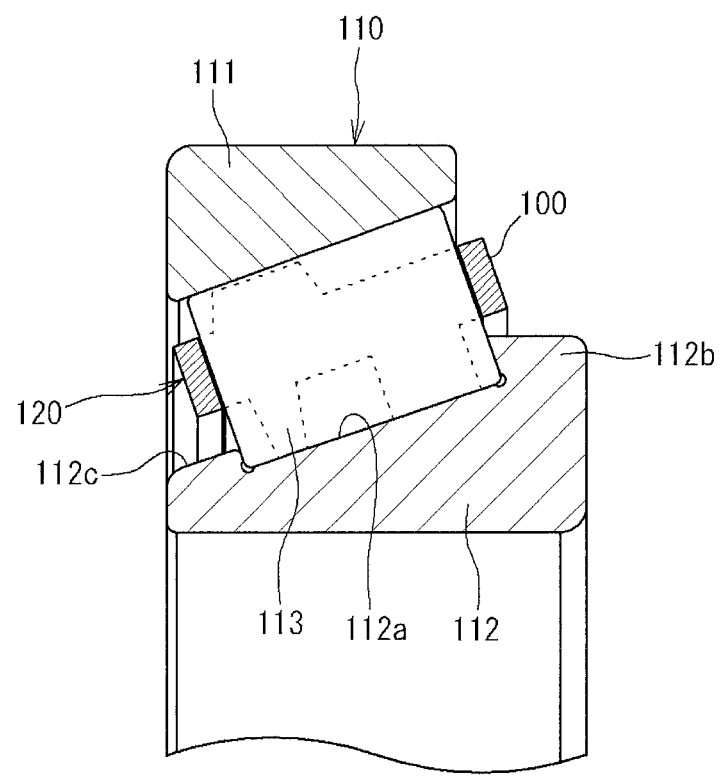
FIG. 6 is a sectional view of a main portion of a tapered roller bearing in which the conventional cage segments are used.

FIG. 4 is a perspective illustration of another example of the cage segment. A cage segment 42 shown in FIG. 4 is a type of cage segment in which tapered rollers are placed into pockets 43 of the cage segment 42 from a radially inner side. The cage segment 42 shown in FIG. 4 is manufactured by injection molding of synthetic resin, as well as the cage segment 2 shown in FIGS. 2 and 3. The cage segment 42 includes a first rim portion 44, a second rim portion 45, and a plurality of bar portions 46. In the cage segment 42, spaces, each of which is surrounded by the two bar portions 46 adjacent to each other and the first and second rim portions 44 and 45, are formed as the pockets 43 that house the rolling elements (not shown). The first and second rim portions 44 and 45 are spaced from each other by a predetermined interval and face each other. The bar portions 46 extend from the first rim portion 44 to the second rim portion 45.

In this cage segment 42 as well, a projection portion 50 for reinforcement is formed at a radial end portion (a radially outer-side end portion) of a boundary between each bar portion 46 and the second rim portion 45. In the cage segment 42 shown in FIG. 4, distal expanded portions 47 are formed on a radially outer-side surface 48 of each bar portion 46. Protrusion portions 49 are formed on a radially inner-side surface of each bar portion 46. A distal end surface of each distal expanded portion 47 is slidable with respect to the raceway surface of an outer ring of a tapered roller bearing in which the cage segments 42 are disposed. On the other hand, a distal end surface of each protrusion portion 49 is slidable with respect to the raceway surface of an inner ring of the tapered roller bearing in which the cage segments 42 are disposed. Side surfaces 47a of each distal expanded portion 47 are curved surfaces configured so as to receive tapered rollers.

The embodiments disclosed in this specification should be considered to be merely illustrative and not restrictive. The scope of the invention is shown not by the meanings indicated above but by the appended claims, and is intended to cover all the modifications and changes within the scope of the claims and the meanings and scope equivalent to those of the claims.

For example, in the foregoing embodiments, the projection portions are formed at the radially outer-side end portions of the boundaries between the bar portions and one of the rim portions. However, instead of these projection portions or in addition to these projection portions, projection portions may be formed at radially inner-side end portions of the boundaries between the bar portions and one of the rim portions. Furthermore, not only the boundaries between the bar portions and one of the two rim portions but also the boundaries between the bar portions of the other rim portion may be provided with projection portions. Thus, the positions of the projection portions are not particularly limited in the invention.

Furthermore, although in the foregoing embodiments, the projection portions are formed integrally with the protrusion portions or the distal expanded portions of the bar portions, the projection portions may be formed separately from the bar portions, and may be fixed at predetermined locations on the bar portions.

Furthermore, although the side surfaces of the projection portions are curved surfaces in the foregoing embodiments, the side surfaces of the projection portions may be flat inclined surfaces (inclined side surfaces, a distance between which gradually increases in the direction toward the rim portion-side) that face the pockets.

In the split cage according to the invention, the strength of the connecting portions between the bar portions and the rim portion(s) can be improved.

What is claimed is:

1. A split cage for a rolling bearing, comprising:
a plurality of cage segments formed of synthetic resin and arranged annularly in a circumferential direction, each of the cage segments including:
  a first rim portion and a second rim portion that are spaced from each other by a predetermined interval and face each other; and
  a plurality of bar portions extending from the first rim portion to the second rim portion,
wherein spaces, each of which is surrounded by the bar portions adjacent to each other, the first rim portion and the second rim portion, are formed as pockets that house rolling elements,
wherein projection portions for reinforcement are formed at radial end portions of boundaries between the bar portions and the first rim portion and/or boundaries between the bar portions and the second rim portion, and
wherein each of the projection portions has curved surfaces so as to guide lubricating oil to the pockets, a distance between the curved surfaces increases in a direction toward a rim portion-side in a plan view, and the curved surfaces face the pockets.

* * * * *